March 7, 1933.  M. M. BORDEN  1,900,273
FLOW CONTROLLER
Filed Oct. 28, 1927   2 Sheets-Sheet 1

Inventor:
Moro M. Borden,
By
Attorney.

March 7, 1933.  M. M. BORDEN  1,900,273
FLOW CONTROLLER
Filed Oct. 28, 1927   2 Sheets-Sheet 2

Inventor:
Moro M. Borden,
By [signature]
Attorney.

Patented Mar. 7, 1933

1,900,273

UNITED STATES PATENT OFFICE

MORO M. BORDEN, OF COLLINGSWOOD, NEW JERSEY, ASSIGNOR TO SIMPLEX VALVE & METER COMPANY, OF PHILADELPHIA, PENNSYLVANIA, A CORPORATION OF DELAWARE

FLOW CONTROLLER

Application filed October 28, 1927. Serial No. 229,423.

My invention is a controller for regulating the rate of flow through a conduit and preventing abrupt variations therein, and the leading object of my invention is to minimize the unrecoverable loss of pressure or head commonly resulting from the use of a rate of flow controller. The greater part of the unrecoverable loss of head resulting from the use of a flow controller occurs in the ports of the valve openings and is proportional to a function of the quantity of liquid passing through such ports. By my improvements such unrecoverable loss of head is minimized by by-passing a portion of the liquid in such a way that its pressure effect will be delivered to the diaphragm controlling the automatic regulating valves but will not have to pass through the ports of such regulating valves or through fittings external to the conduit or controller.

In the preferred embodiment of my invention, a Venturi tube inserted in the fluid conduit is connected at its discharge end with a valve body containing a partition having ports controlled by a double disc type balanced valve operable by a diaphragm having one surface exposed to the fluid pressure in the valve body and the opposite surface exposed to the pressure of the fluid at the neck of the Venturi tube, and such partition is further provided with one or more ports unaffected by variations in the rate of flow but preferably having openings manually variable to suit particular conditions. With this construction, a pre-determined quantity of fluid may be passed through the controller without substantial loss of head and the limits of flow are automatically controlled by the diaphragm-operable valves to avoid sudden changes in the total rate of flow through the conduit.

The characteristic features and advantages of my improvements will more fully appear from the following descriptions and the accompanying drawings in illustration thereof.

Figure 1:
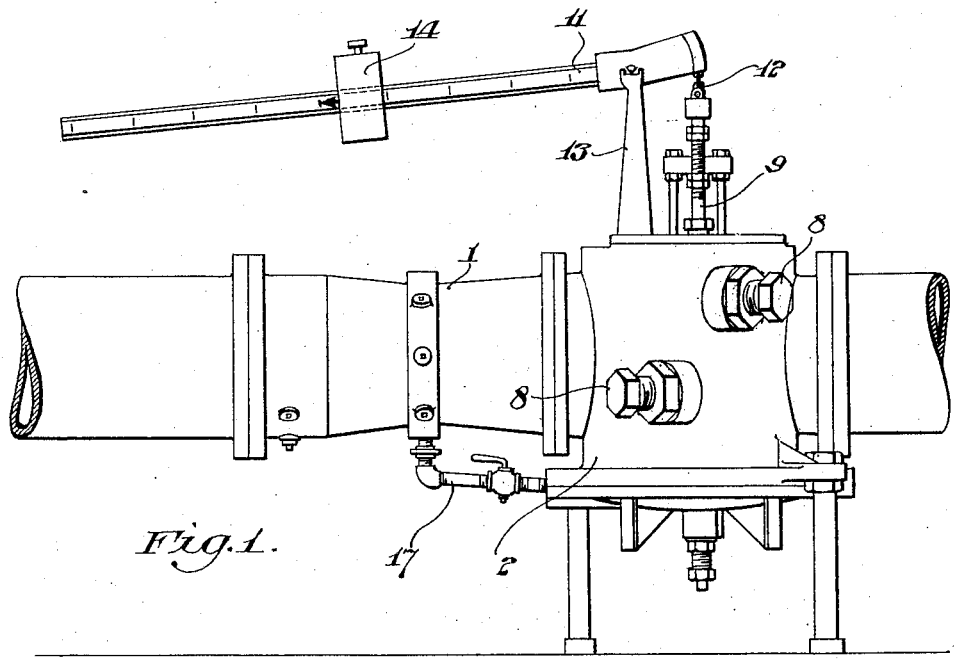
Figure 2:
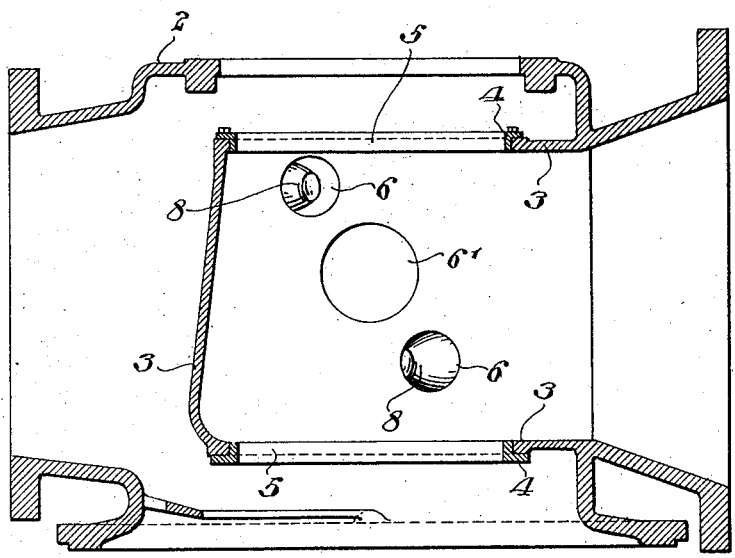
Figure 3:
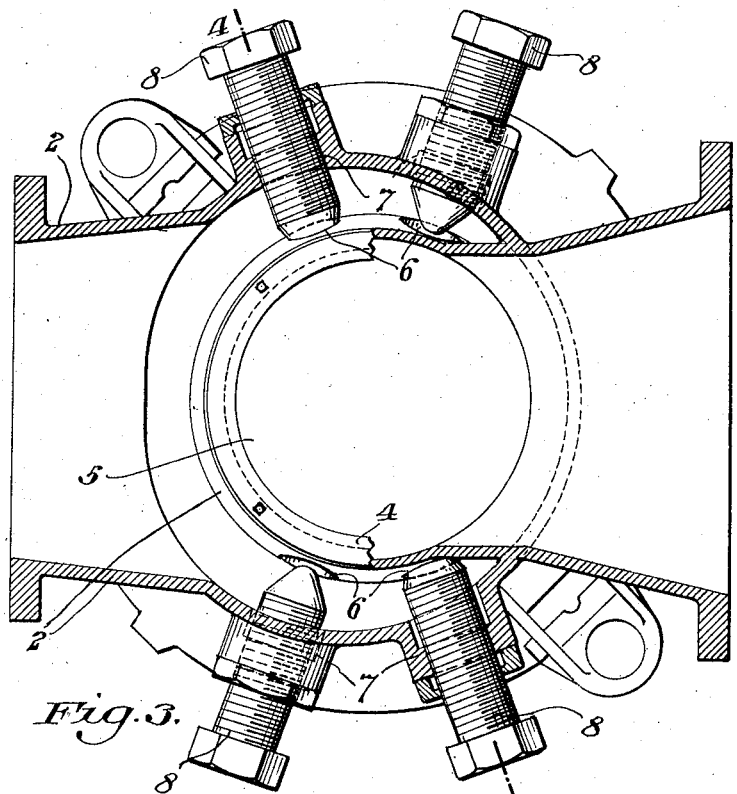
Figure 4:
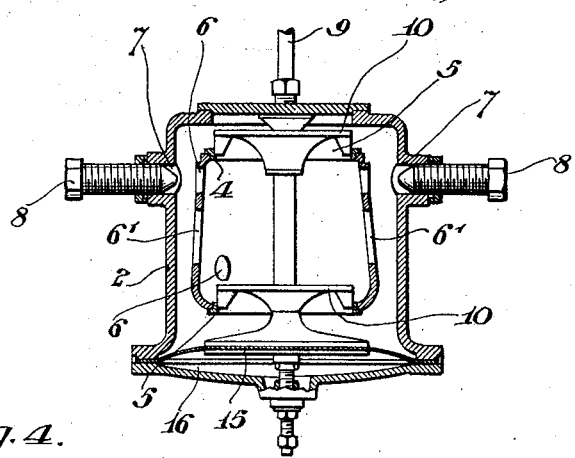

In the drawings, Fig. 1 is a side elevation of a flow controller embodying my improvements; Fig. 2 is an enlarged longitudinal vertical sectional view thereof; Fig. 3 is an enlarged horizontal longitudinal sectional view of the valve chamber; and Fig. 4 is a transverse sectional view thereof.

As illustrated in the drawings, a conduit containing a Venturi section 1 has connected therewith a valve body 2 containing the partition 3 in which are fixed the valve seats 4 surrounding the ports 5. The wall of the partition intermediate the valve seats 4 contains the ports or passages 6 and 6′; the passages 6 being preferably disposed in alignment with the openings 7 in the valve body 2 so that the nut-locked threaded plugs 8 movable in the openings 7 may be advanced or retracted to close or open the apertures 6. The passages 6 and 6′ are preferably so positioned as to divert the water therethrough transversely to its normal direction of flow through the conduit.

A stem 9, reciprocable in the valve body 2, has fixed thereto the valve discs 10 controlling the ports 5, and whose weight is counterbalanced by a lever 11 connected by a flexible coupling 12 with the stem 9, fulcrumed on the standard 13, and having an adjustable counterweight 14.

The valve stem has fixed thereto an elastic diaphragm 15 mounted in the valve body 2 so that one face thereof is exposed to the pressure of the fluid in the valve body and the other face is exposed to the pressure of fluid admitted by the valve controlled pipe 17 from the throat of the Venturi tube to the chamber 16 formed by the diaphragm 15 and the valve body.

It will be understood that the plugs 8 are manually so positioned relatively to the ports 6 as to permit the passage therethrough and through the ports 6′ of a desired minimum quantity of fluid without substantial diminution of the head thereof, and the remainder of the flow will pass through the ports 5 under control of the valve discs 10 which are automatically positioned by the action on the diaphragm 15 of the unbalanced pressures communicated thereto from the fluid in the valve body and in the Venturi throat; the action of the diaphragm being adjustable by moving the counterweight 14 toward or from the fulcrum of the lever 11.

Having described my invention, I claim:

1. A rate of flow controller comprising a casing having therein a partition containing ports, valve mechanism operable by variations in the rate of flow for opening a port aforesaid as flow decreases and closing such port as flow increases, and thereby maintaining a substantially constant rate of flow and manually operable means projecting through said casing for controlling a port aforesaid uncontrolled by said valve.

2. A rate of flow controller comprising a casing containing means for controlling the rate of flow of a fluid and comprising a partition and valve mechanism operable by variations in the rate of flow to open the valve as flow decreases and close the valve as flow increases and thereby maintaining a substantially constant rate of flow, said means containing ports forming openings unvaried by changes in the rate of flow.

3. A rate of flow controller comprising a casing containing means for controlling the rate of flow of a fluid and comprising a partition and valve mechanism operable by variations in the rate of flow to open the valves as flow decreases and close the valve as flow increases and thereby maintaining a substantially constant rate of flow, said means containing ports forming openings unvaried by changes in the rate of flow, and means for varying the openings of said ports.

4. In apparatus of the character described, a conduit, differential pressure mechanism operable by variations in the rate of flow in said conduit, a valve operable by said mechanism to close said valve as flow increases and open said valve as flow decreases and prevent abrupt variations of flow through said conduit and maintain a substantially constant rate of flow, and means containing ports by-passing a portion of the flow through said conduit around said valve said mechanism being subject to the pressure effect of the total flow through said conduit.

5. A rate of flow controller comprising a conduit and means for maintaining a substantially constant flow through said conduit and minimizing unrecoverable loss of pressure, said means comprising a regulating valve, valve operating mechanism, and means forming a by-pass around said regulating valve, the pressure effect of the total flow through the conduit being delivered to said valve operating mechanism without the passage of the by-passed fluid through the port of said regulating valve, and means for communicating a different pressure from said conduit to said valve operating mechanism to counteract the effect of said flow.

6. A rate of flow mechanism comprising an upstream conduit section and a downstream conduit section, valve mechanism controlling a port through which said conduit sections communicate and through which a portion only of the total flow passes, means forming a by-pass around said port and passing the remainder of the total flow between said conduit sections, and differential pressure mechanism subject to the pressure effect of the total flow through said conduit sections, said differential pressure mechanism operating said valve mechanism with variations in flow and maintaining a substantially constant total flow through said conduit sections.

7. A rate of flow mechanism comprising an upstream conduit section and a downstream conduit section, valve mechanism controlling a port through which said conduit sections communicate and through which a portion only of the total flow passes, means forming a by-pass around said port and passing the remainder of the total flow between said conduit sections, and differential pressure mechanism subject to the pressure effect of the total flow through said conduit sections, said differential pressure mechanism operating said valve mechanism with variations in flow and maintaining a substantially constant total flow through said conduit sections, and means for controlling said by-pass.

In testimony whereof I have hereunto set my name this 18th day of October 1927.

MORO M. BORDEN.